April 13, 1965 G. R. BECK 3,177,611

SNAP ACTION DISK ELEMENT FOR TOY STRUCTURES

Filed Dec. 31, 1962

George R. Beck
INVENTOR.

BY Karl G. Ross
AGENT.

3,177,611
SNAP ACTION DISK ELEMENT FOR TOY STRUCTURES

George R. Beck, 530 Pleasant St., Boulder, Colo.
Filed Dec. 31, 1962, Ser. No. 248,487
6 Claims. (Cl. 46—25)

My present invention relates to a building element for toy structures of the type disclosed in my U.S. Patent No. 2,984,935, issued May 23, 1961.

The building element described and shown in the above patent comprises a flat, generally circular disk provided with a series of radially extending peripheral notches, the width of each notch equaling the thickness of the disk whereby several identical disks may be matingly interfitted to form a structure. Generally, these disks are made of a plastic material of suitable resiliency.

The frictional fit of the interlinked disks is not always satisfactory because of wear and of the practical impossibility to maintain uniformity of disk thickness and of notch width. My present improvement aims at obviating this drawback.

In accordance with my instant invention I provide a building element of the same general character as that disclosed in my prior patent but of stepped thickness so as to bring about a more positive interlocking effect. For this purpose the disk consists of a preferably annular peripheral portion of uniform thickness and a central portion of relatively reduced thickness, the notches lying in the peripheral portion and terminating advantageously at its junction with the central portion although in some instance certain of these notches could also extend deeper into the central portion. If the width of the notches substantially equals the thickness of the central portion, interengagement of two identical disks at right angles to each other will at first spread apart the periphery of each disk at the notch receiving the other disk until the thicker peripheral portion of that other disk has cleared the notch and two disks snap into releasably interlocking contact. Naturally, the difference in thickness between the peripheral and central portions should be only a small fraction of a notch width so as to avoid objectionable deformation of a disk beyond its limits of elasticity and shear strength.

The invention will be described in greater detail with reference to the accompanying drawing in which.

Figures 1, 2, 3:
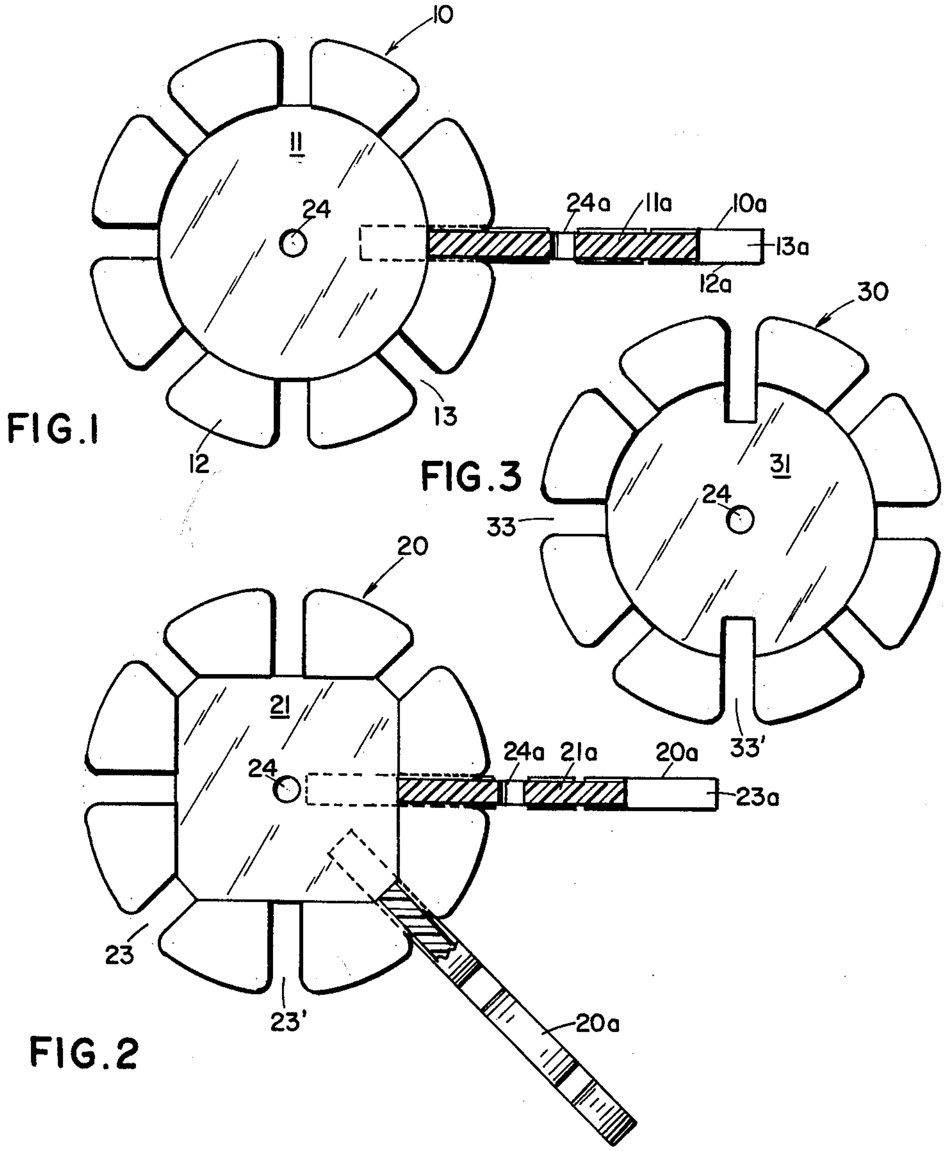
FIG. 1 is a view of two interconnected disks embodying my present improvement, one disk being shown in face view and the other in axial section.
FIG. 2 is a face view of a slightly modified disk according to the invention, with two co-operating disks shown in dot-dash outline.
FIG. 3 is a face view of still another modification.

In FIG. 1 I have illustrated two identical disks 10 and 10*a* each having a circular central portion 11, 11*a* of reduced thickness, a peripheral portion 12, 12*a* of slightly greater thickness (the difference having been exaggerated in the drawing) and angularly equispaced notches 13, 13*a* extending radially from the circumference of each disk to the junction of the two portions. It will be noted that the two disks are interengaged to the full depth of the notches 13, 13*a* whose width equals the thickness of the reduced central portions 11, 11*a*. A center hole 24, 24*a* serves for the introduction of a mounting pin or shaft.

FIG. 2 illustrates a disk 20 with notches 23, 23' which, for reasons explained in my prior patent, vary in length so that shorter notches 23 alternate with longer notches 23'. The notches are spaced apart by 45°, as in the preceding embodiment, and the length of the notches 23' is almost half the radius of the disk. The relative length of notches 23 and 23' is so selected that the center holes 24 of co-operating identical disks 20*a*, 20*b* remain vertically aligned whereby alignment is also maintained between further disks (not shown) attached thereto as illustrated in FIG. 4 of my earlier patent. The central portion 21 has here a substantially square outline defining the inner ends of all the notches 23 and 23' so that yieldable interlocking occurs as either disk 20*a*, 20*b* reaches the limit of its engaging motion.

In FIG. 3 I have shown a disk 30 whose reduced-thickness central portion 31 is of circular outline, with the shorter notches 33 terminating at this outline and the longer notches 33' extending therebeyond. This leads to a certain radial play between disk 30 and another disk snapping into notch 33', yet such play may not be objectionable inasmuch as the proper relative position of the interengaged disks is generally maintained by other elements of the structure of which they form a part. Disk 30 is shown to have only one pair of diametrically opposite longer notches 33'.

It will be understood that the stepped surface at the junction of the two portions of different thickness may be provided on just one face of the disk, and that other departures from the specific configurations described and illustrated are possible without departing from the spirit and scope of my invention as defined in the appended claims.

I claim:

1. A building element for toy structures, comprising a flat disk of resiliently flexible material, said disk consisting of a peripheral portion of uniform thickness and a flat central portion of relatively reduced thickness occupying the remainder of said disk, said peripheral portion being formed with angularly spaced radial notches extending from the disk circumference to at least the junction of said central and peripheral portions, said notches having a width in a direction parallel to the plane of the disk which is less than the thickness of said peripheral portion and a depth in the direction of the thickness of the disk greater than said width.

2. A building element for toy structures, comprising a generally circular flat disk of resiliently flexible material, said disk consisting of a peripheral portion of uniform thickness and a flat central portion of relatively reduced thickness occupying the remainder of said disk, said peripheral portion being formed with angularly spaced radial notches extending from the disk circumference to at least the junction of said central and peripheral portions, said notches having a width in a direction parallel to the plane of the disk which is less than the thickness of said peripheral portion and a depth in the direction of the thickness of the disk greater than said width.

3. A building element for toy structures, comprising a flat disk of resiliently flexible material, said disk consisting of a peripheral portion of uniform thickness and a flat central portion of relatively reduced thickness occupying the remainder of said disk, said peripheral portion being formed with angularly spaced radial notches extending from the disk circumference to at least the junction of said central and peripheral portions, said notches having a width in a direction parallel to the plane of the disk which is less than the thickness of said peripheral portion and a depth in the direction of the thickness of the disk greater than said width, said width substantially equaling the thickness of said central portion.

4. A building element for toy structures, comprising a a generally circular flat disk of resiliently flexible material, said disk consisting of a peripheral portion of uniform thickness and a flat central portion of relatively reduced thickness occupying the remainder of said disk, said peripheral portion being formed with angularly spaced radial notches extending from the disk circumference to at least the junction of said central and peripheral portions, said notches having a width in a direction parallel to the plane of the disk which is less than the thickness of said peripheral portion and a depth in the direction of the thickness of the disk greater than said width, said width substantially equaling the thickness of said central portion.

5. A building element for toy structures, comprising a generally circular flat disk of resiliently flexible material, said disk consisting of an annular peripheral portion of uniform thickness and a flat circular central portion of relatively reduced thickness occupying the remainder of said disk, said peripheral portion being formed with angularly equispaced radial notches extending from the disk circumference to the junction of said central and peripheral portions, said notches having a width in a direction parallel to the plane of the disk which is less than the thickness of said peripheral portion and a depth in the direction of the thickness of the disk greater than said width.

6. A building element for toy structures, comprising a generally circular flat disk of resiliently flexible material, said disk consisting of an annular peripheral portion of uniform thickness and a flat circular central portion of relatively reduced thickness occupying the remainder of said disk, said peripheral portion being formed with angularly equispaced radial notches extending from the disk circumference to the junction of said central and peripheral portions, said notches having a width in a direction parallel to the plane of the disk which is less than the thickness of said peripheral portion and a depth in the direction of the thickness of the disk greater than said width, said width substantially equaling the thickness of said central portion.

References Cited by the Examiner

UNITED STATES PATENTS

| | | | |
|---|---|---|---|
| 1,995,482 | 3/35 | Plautz | 217—30 |
| 2,633,662 | 4/53 | Nelson | 46—25 |
| 2,844,910 | 7/58 | Korchak | 46—28 |
| 2,984,935 | 5/61 | Beck | 46—25 |

RICHARD C. PINKHAM, *Primary Examiner.*